Jan. 20, 1959
G. USTIN
2,870,239
ELECTRICAL CONNECTOR
Filed Feb. 14, 1955
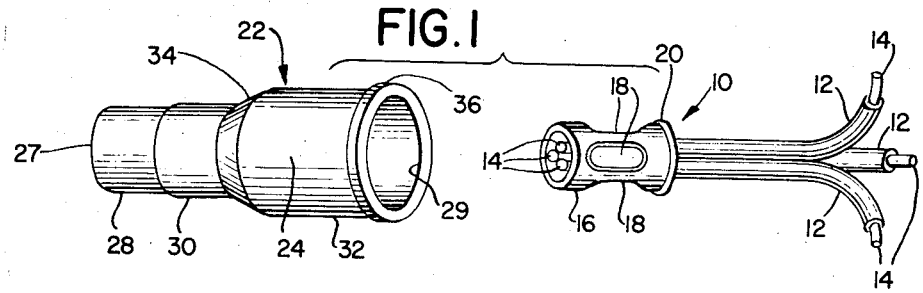
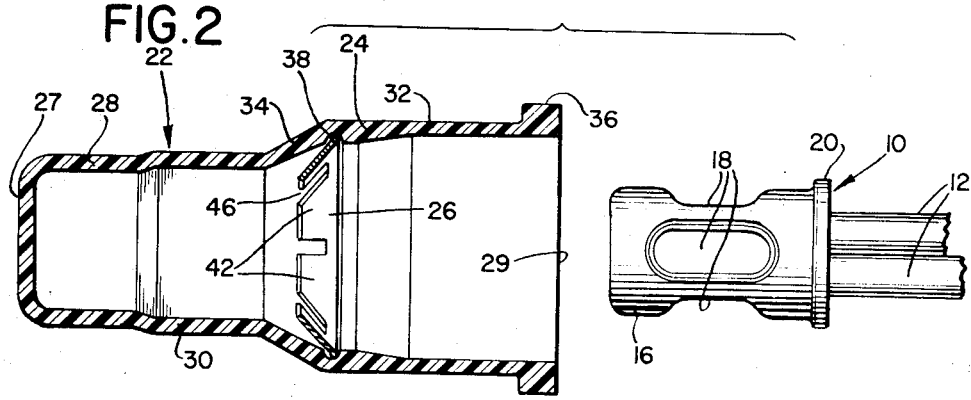
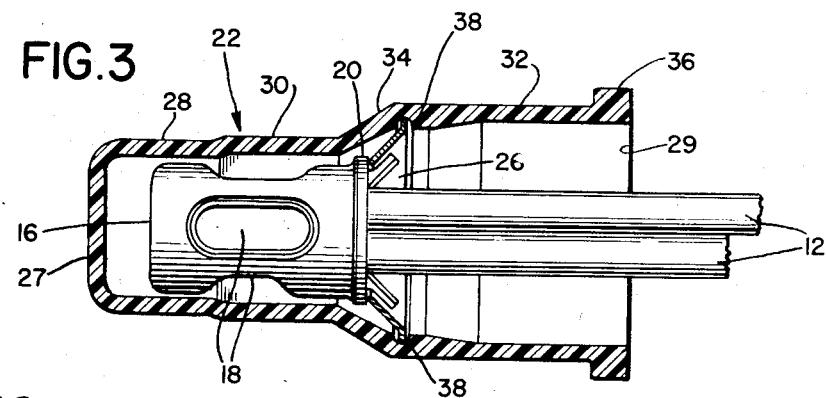
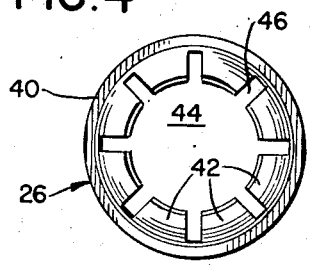
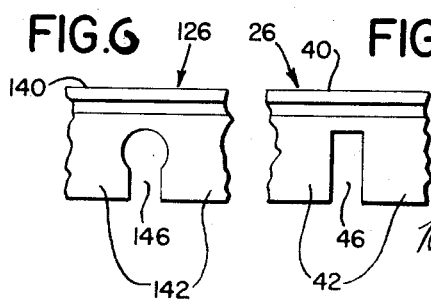
INVENTOR
GEORGE USTIN
Richard A. Craig
ATTORNEY

United States Patent Office 2,870,239
Patented Jan. 20, 1959

2,870,239

ELECTRICAL CONNECTOR

George Ustin, Verona, N. J., assignor to Buchanan Electrical Products Corporation, Hillside, N. J., a corporation of New Jersey Application February 14, 1955, Serial No. 487,860

1 Claim. (Cl. 174—87)

This invention relates generally to electrical connectors and more particularly to an improved insulating cover for a known assembly of a plurality of electrical conductors and a tubular element or splice cap into which the conductors are inserted and which is permanently crimped to the conductors to hold them together electrically and mechanically.

The cover will be sometimes referred to herein as a splice cap cover or a splice cap insulator.

In a preferred form, a splice cap cover in accordance with the invention comprises a tubular body having a closed end and an open end and a retainer permanently positioned within the body and having a plurality of resilient projections the inner ends of which define an opening through which the splice cap can pass only in the direction toward the closed end of the body.

Splice cap covers of other types have been proposed, but most have been subject to the disadvantage that they are subject to accidental removal from the splice cap. Minimum pull-out requirements have been established for splice cap covers, and many prior covers cannot meet these requirements.

It is accordingly an important object of the invention to provide a splice cap cover which cannot become accidentally separated from the splice cap with which it is used, and which will have adequate pull-out characteristics.

It is another object to provide a splice cap cover which is readily applied by hand to a splice cap.

It is a further object to provide a splice cap cover which is of simple construction and which is readily and cheaply made.

The above and other objects and advantages will become apparent from the following description of a preferred embodiment of the invention and the accompanying drawings in which:

Fig. 1 is a perspective view showing a splice cap cover in accordance with the invention and an assembly of a plurality of wires and a splice cap crimped to the conductors thereof, with the splice cap about to be inserted into the splice cap cover;

Fig. 2 is a view similar to Fig. 1 but showing the splice cap cover of Fig. 1 in longitudinal section;

Fig. 3 is a view similar to Fig. 2 but showing the splice cap cover fully applied to the splice cap;

Fig. 4 is a view of the retainer alone as seen from the left of Figs. 2 and 3;

Fig. 5 is a fragmentary view of the retainer shown in Figs. 2 through 4; and

Fig. 6 is a view similar to Fig. 5 but showing a modified form of retainer.

In the drawings there is shown a previously known assembly (indicated generally at 10) of a plurality of insulated wires 12 having conductors 14 from which the insulation has been stripped at one end where conductors 14 are twisted together and a tubular splice cap 16 of electrically conductive malleable material. The stripped ends of wires 12 have been inserted into splice cap 16 which has been permanently secured thereto as by crimping indicated at 18 securely to join conductors 14 mechanically and electrically.

Splice cap 16 is initially (before the crimping) of constant external diameter except for an external circumferential flange 20 therearound at the end of cap 16 into which conductors 14 are inserted. As the crimp is effected the diameter of cap 16 is changed both at crimps 18 and elsewhere, but the outside diameter of flange 20 remains substantially larger than that of any other portion of cap 16. For simplicity the changes in diameter have not been shown except at crimps 18.

Fig. 1 also shows a splice cap cover 22 embodying the invention and comprising a body 24 and a retainer 26 which is shown in Figs. 2 through 5.

Body 24 is of insulating material, of which a preferred example is nylon, and is advantageously of one-piece molded construction. As shown, body 24 is generally tubular and has a closed end 27 and an open end 29 between which are coaxial annular portions 28, 30 and 32 of progressively larger diameters in the order given.

Portion 28 terminates at one end at closed end 27 and at the other end merges with portion 30. A frusto-conical portion 34 joins the end of portion 30 and one end of portion 32, the other end of which terminates at open end 29.

The wall thickness of body 24 is substantially constant except for the provision of an external stiffening flange 36 on portion 32 at open end 29 and a slight thickening to increase rigidity from the end of portion 34 where it merges with portion 30 to a location intermediate the ends of portion 32.

Body 24 has an internal circumferential groove or recess 38 located substantially at the end of portion 32 remote from open end 29.

Retainer 26 is of resilient sheet material, of which a preferred example is Phosphor bronze, and has an external annular flange 40 defining an axis and a plurality (eight as shown) of projections or fingers 42 extending toward the axis of retainer 26 from flange 40 and inclined at a constant angle in the same direction from the plane of flange 40. The inner ends of projections 42 are free and as shown most clearly in Fig. 4 define a circular opening 44 which as shown most clearly in Figs. 2 and 3 is offset axially from the plane of flange 40.

The inside and outside diameters of flange 40 are roughly the same as the inside and outside diameters of groove 38, and as shown in Figs. 2 and 3, retainer 26 and body 24 are permanently assembled with flange 40 in groove 38 and with projections 42 inclined toward closed end 27 of body 24, so that opening 44 is located between the plane of flange 40 and end 27.

The assembly of retainer 26 and body 24 can be conveniently performed with a punch press or in any other suitable manner.

When projections 42 are unstressed, that is, when they are in their normal positions as shown in Figs. 2 and 3, opening 44 is of its normal size in which its diameter is less than the external diameter of flange 20 of cap 16.

The inside diameter of portion 32 is greater than the largest outside diameter of cap 16, which as shown is that of its flange 20. As shown, the inside diameter of portion 28 is slightly greater than the outside diameter of cap 16 except for its flange 20, and is less than that diameter, whereas the inside diameter of portion 30 is slightly greater than the diameter of flange 20.

In operation, cover 22 and assembly 10 are placed in the relative positions shown in Fig. 2. Then cap 16 is inserted into open end 29 of body 24 and is moved toward closed end 27 thereof until flange 20 engages the sides of projections 42 toward open end 29. Relatively small additional force will then cause flange 20 to flex projections 42 from their normal positions toward closed end 27 to expand opening 44 from its normal size until flange 20 slides therethrough. Projections 42 then return to their normal positions and opening 44 to its normal size. The parts are then as shown in Fig. 3 and the connection is complete. Cap 16 is captive in cover 22 and force tending to pull cap 16 out of cover 22 will tend to deform projections 42 from their normal positions toward open end 29 to reduce the diameter of opening 44 from its normal size.

Thus cap 16 is securely and permanently secured in cover 22.

Adjacent pairs of projections 42 have gaps 46 therebetween which are rectangular in shape as shown in Figs. 2 through 5. Fig. 5 is a fragmentary enlarged view of retainer 26 taken at right angles to the plane of one of gaps 42.

Fig. 6 is a view similar to Fig. 5 showing a modified retainer 126 which has been used with satisfactory results having a flange 140 identical to flange 40 and projections 142 similar to projections 42, there being gaps 146 between adjacent pairs of projections 142. Gaps 146 are parallel-sided in the vicinity of the free ends of projections 142, but the closed ends of gaps 146 are arcuate and of diameter greater than the width of gaps 146 at their parallel-sided portions.

Many changes will occur to those skilled in the art without departing from the invention. The illustrated details are accordingly not to be taken as limitations on the invention except as the details are included in the appended claim.

I claim:

An insulating cover for an assembly of a splice cap and electrical conductors, said splice cap having an external flange at the end thereof remote from the ends of said conductors, said flange being of greater diameter than the remainder of said splice cap, said cover comprising a tubular body of rigid insulating material having an open end and a closed end and an internal annular circumferentially continuous recess spaced from said closed end, and a separate retaining ring of spring metal having an external annular circumferentially continuous flange permanently seated in said recess, thus holding said ring captive in predetermined position in said body, said ring further having a plurality of resilient circumferentially separate, inwardly extending projections extending toward the axis of said body from the external flange of said ring and inclined toward said closed end, said projections having free inner ends defining an opening farther from said open end than said last-mentioned external flange and farther from said closed end than the axial length of said cap, said opening normally of smaller diameter than the external flange of said cap, so that as said cap passes through said opening toward said closed end it will engage said projections and expand said opening to permit said cap to pass completely therethrough after which said projections will return to their normal positions and said opening to its normal size and force tending to move said cap through said opening toward said open end will tend to deform said projections toward said open end to contract said opening thus to prevent said cap from passing through said opening toward said open end.

References Cited in the file of this patent

UNITED STATES PATENTS

| | | |
|---|---|---|
| 913,024 | Meacham | Feb. 23, 1909 |
| 2,122,252 | Hayes | June 28, 1938 |
| 2,424,804 | Swart | July 29, 1947 |
| 2,592,130 | Erb et al. | Apr. 8, 1952 |
| 2,701,273 | Badeau | Feb. 1, 1955 |
| 2,792,444 | Bergan | May 14, 1957 |